Figure 1:
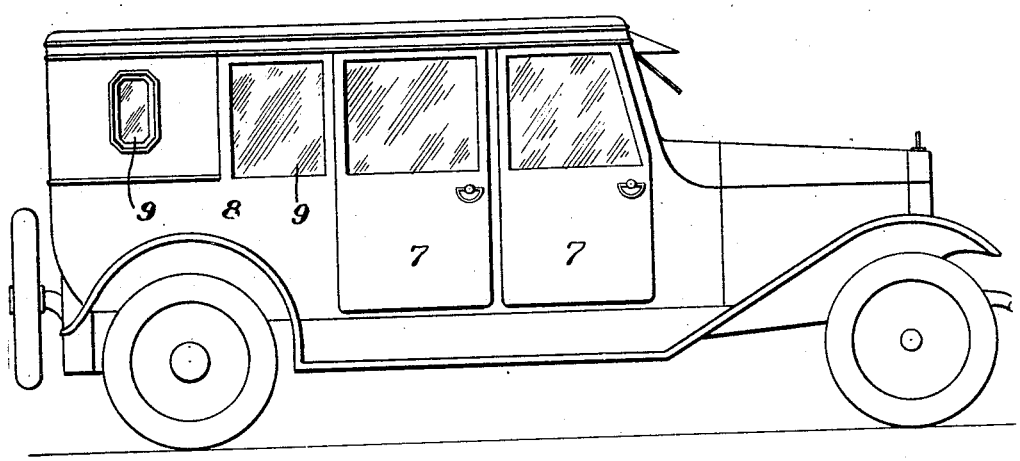

Feb. 7, 1928.
1,658,110

C. J. WARREN

CONVERTIBLE AUTOMOBILE

Filed May 15, 1920   3 Sheets-Sheet 1

Inventor
Clinton J. Warren
By Mitchell, Chadwick & Kent
Attorneys.

Feb. 7, 1928.                                                 1,658,110
C. J. WARREN
CONVERTIBLE AUTOMOBILE
Filed May 15, 1920          3 Sheets-Sheet 2
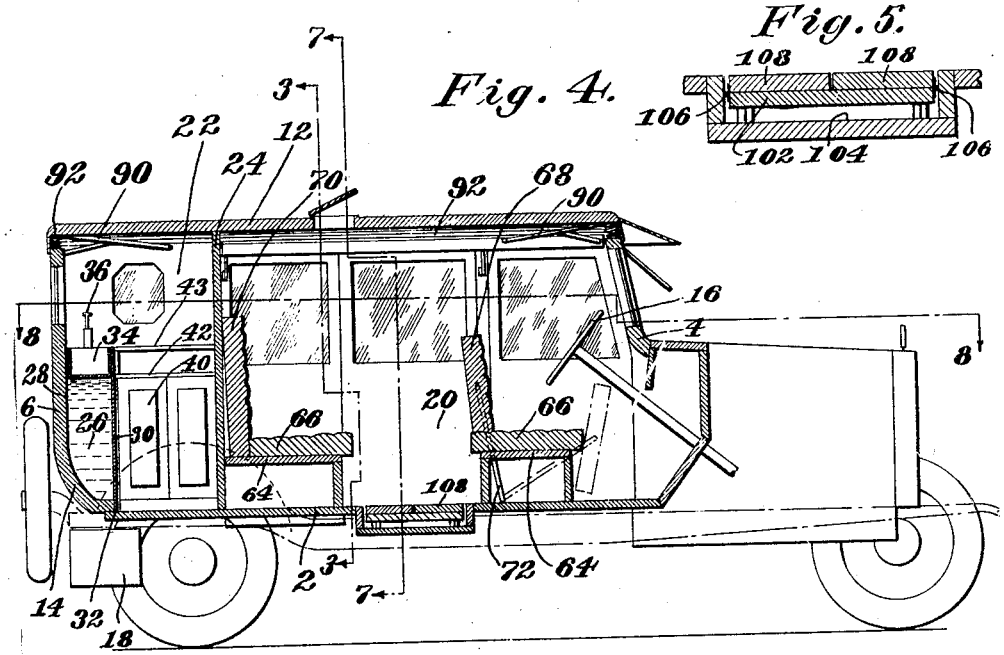
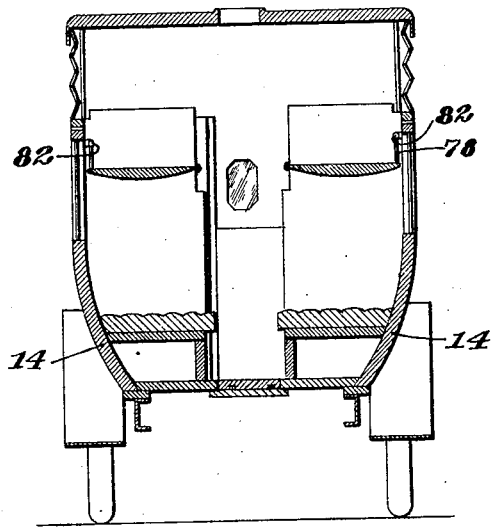
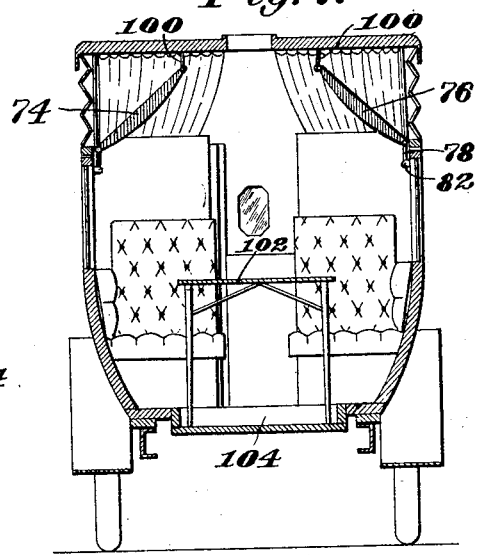
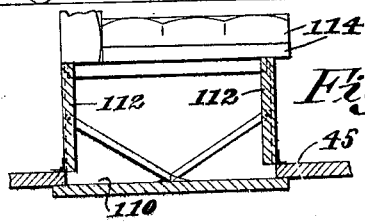
Inventor
Clinton J Warren
By Mitchell, Chadwick & Kent
Attorneys.

Feb. 7, 1928.
C. J. WARREN
1,658,110
CONVERTIBLE AUTOMOBILE
Filed May 15, 1920    3 Sheets-Sheet 3
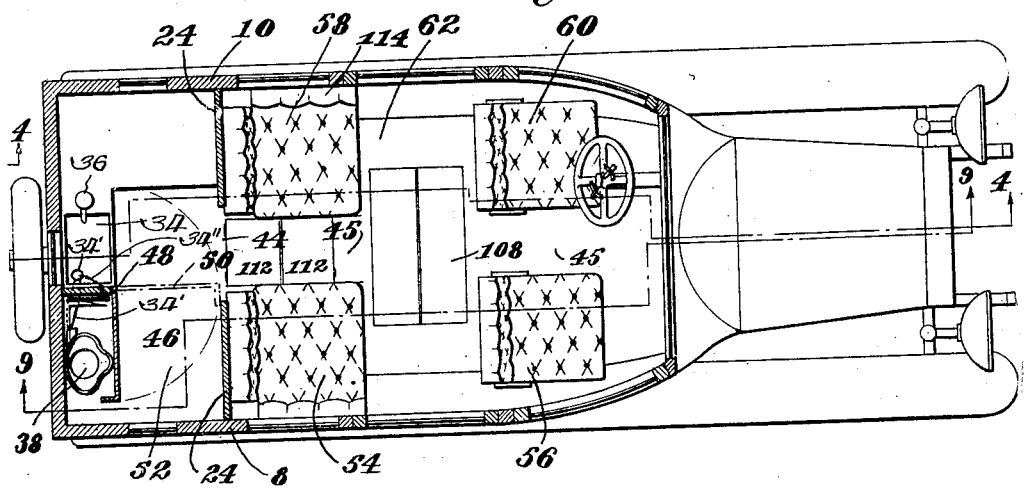
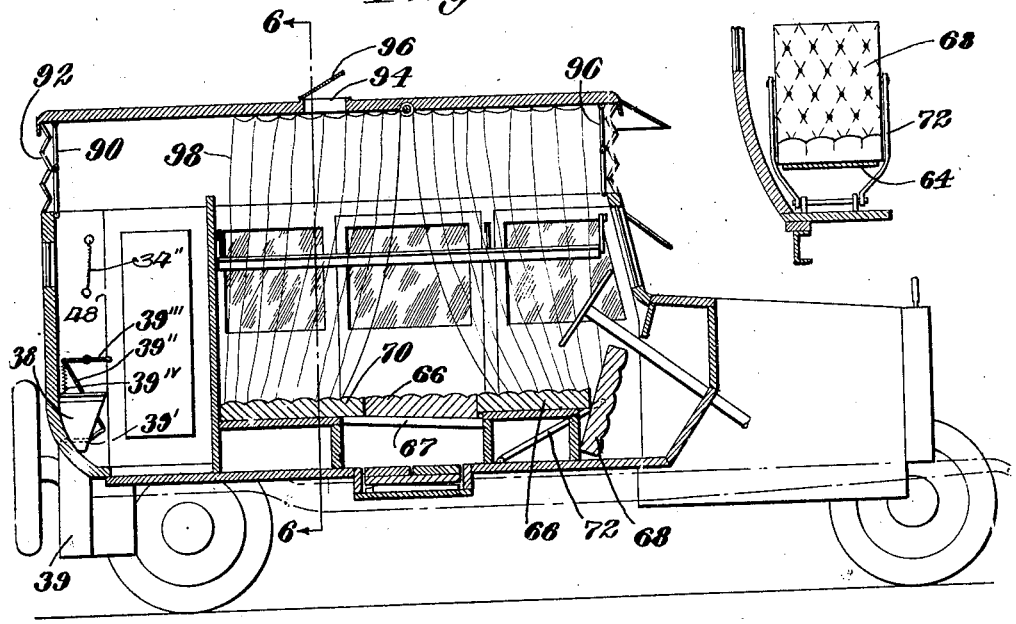
Inventor
Clinton J. Warren
By Mitchell, Chadwick & Kent
Attorneys.

Patented Feb. 7, 1928.

1,658,110

UNITED STATES PATENT OFFICE.

CLINTON J. WARREN, OF WINCHESTER, MASSACHUSETTS.

CONVERTIBLE AUTOMOBILE.

Application filed May 15, 1920. Serial No. 381,666.

This invention relates to convertible automobiles adapted to be used both for touring and for camping. Various efforts to accomplish this general purpose have been made, but cars hitherto proposed, in which appliances for travel and also for camping are combined, have been so characteristically ungainly in appearance or complicated in structure, bearing resemblance to a prairie schooner, a commercial truck, or an ambulance, that in order to preserve the pleasure, comfort and speed of general riding it has been thought necessary to provide and to tow a separate vehicle as a trailer, for carrying the camping appliances, this trailer being convertible by various devices so as to extend laterally on the ground and afford beds and shelter when a stop is made. In consequence, there has been for years a marked demand for an automobile which has the convenience of a regular limousine body when on the road, with its characteristic appearance and grace of design, not indicating by its apearance that it is anything else, and yet which is readily adaptable for use for sleeping and eating.

The object of the present invention is to produce an automobile car body capable of affording the comforts of bedroom, dressing-room, dining room and kitchen, and, if desired, of travelling over the road while these facilities or some of them are in use, while retaining such characteristics of size and form as permit the vehicle to have the external appearance and the internal comforts also of a car with limousine body and seats for touring, the whole being weathertight; self-contained, in the sense of having all of the necessary conveniences always within itself; comfortable for use either for touring or camping; and yet easily convertible from a setting for one use to that for another. This object is attained by providing the construction and disposition of conveniences and necessary parts, made possible by the invention, and herein disclosed, so that the car exteriorly may have the graceful lines and design of high quality closed cars such as hitherto have been available only for driving.

It is intended that the patent shall cover, by suitable expression in the appended claims, whatever features of patentable novelty the invention may possess.

Figure 2:
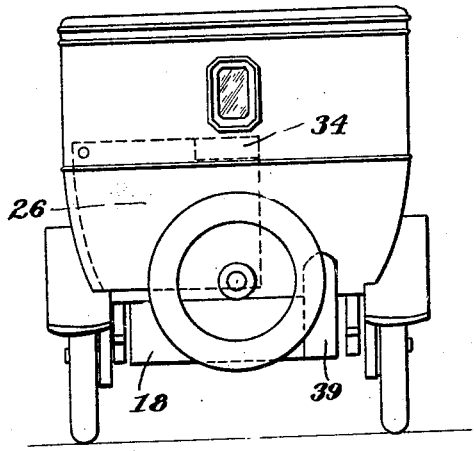
Figure 3:
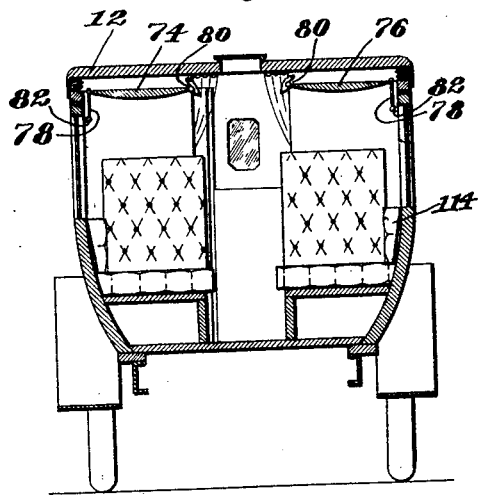
Figure 3A:
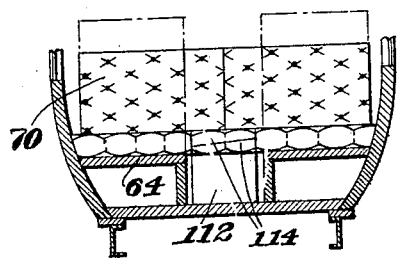

In the drawings, illustrating a preferred embodiment of the present invention;

Figure 1 is a side elevation;
Figure 2 is a rear elevation of the same;
Figure 3 is an elevation showing the interior as arranged for touring with the body in section on the line 3—3 of Figure 4, looking toward the rear;
Figure 4 is an elevation showing the interior arranged the same, in section on the line 4—4 of Figure 8, looking in the direction of the arrows;
Figure 5 is an edge view of a folding table, folded, seen in side elevation corresponding to Figure 4, enlarged;
Figure 6 is an elevation showing the interior arranged for sleeping, with the body in section on line 6—6 of Figure 9, looking in the direction of the arrows;
Figure 7 is an elevation showing the interior arranged for dining with the body in section on line 7—7 of Figure 4, but with the parts differently arranged;
Figure 8 is a plan in section upon the line 8—8 of Figure 4;
Figure 9 is an elevation in section upon the line 9—9 of Figure 8, looking in the direction of the arrows, but with the interior arranged for sleeping; and
Figure 10 is a front elevation of a detail.

The automobile of the present invention may be in outward appearance like a high grade passenger car with limousine body, being made with standard spread and length of wheel base, for example, 136 inches for the latter. It comprises a body having a floor 2, front and rear walls 4 and 6 respectively, side walls 8 and 10, a top 12, and with the usual or any desired entrance doors 7, and any desired windows 9. The rear and side walls slope inward at 14, as is customary, towards the floor, and there are the common appurtenances such as the steering wheel 16 and the gasoline tank 18.

The closed body is interiorly divided into two chief compartments 20 and 22 at the front and the rear respectively, separated by partitions 24. The front compartment may be used for touring, sitting, driving and sleeping; and the rear compartment may serve as lavatory, dressing room, pantry and kitchen.

In the rear compartment, a water tank 26 is situated at the lower part of the rear wall near the side wall 10. In order to economize space the tank's wall 28 is shaped to conform to the sloping portion of the rear wall 6 and its wall 30 opposite thereto rises vertically from substantially the line 32 of juncture between the rear wall and the floor. The tank may be built into the rear wall, as shown, if desired, so that the two may constitute a unit. By this construction, a water tank is provided upon the car without substantially decreasing the floor space. A sink 34 is situated over the tank and is supplied from the tank by a hand pump 36. A water closet 38 is built upon the lower sloping portion of the rear wall at the other side of the car between the tank and the other side wall 8. The water closet occupies as little floor space as the tank, and is separated from the part of the compartment where the sink is by a partition. The water closet is flushed by water from the sink whose drain 34' opens into it and discharges through it, there being if desired, a pull chain 34'' of ordinary type for opening the plug of the drain 34'. It may have a soil pipe 39, with pan 39' operated by lever, link 39'' and handle 39''', maintained normally closed by spring 39$^{iv}$ as shown in Figure 9, or may be otherwise equipped.

An ice box 40 is built upon the first mentioned side wall 10, at the other side of the car and in the kitchen part of the compartment, its rear wall conforming to the sloping side wall, as the tank conforms to the sloping rear wall. A shelf 42 above the ice box, and a second shelf 43 above the shelf 42 afford pantry storage and work space and may support an acetylene cooking range or the like. The remainder of the space, from the ice box, shelves, and side wall 10 to the other side 8 of the car, which will usually be open, and free from obstruction, communicates through a passage or doorway 44, between partitions 24, with the front compartment. A combined door and swinging-partition 46, hinged at 48, normally occupies the position illustrated in Figure 8, where it encloses the water closet in a small space separate from the remainder of the compartment; but this partition may be swung over the dash line area of Figure 8 and past the doorway 44 back against the sink and may then be swung back into the dot-and-dash line position 50, thus enlarging the water closet compartment, permitting the entrance of a person, and then closing the enlarged compartment designated 52.

The front compartment 20 is provided with four chairs 54, 56, 58 and 60 arranged one front and one back on each side of the car body, but forming between them the longitudinal passageway 45 as well as the customary transverse space 62. The chairs comprise bases 64, cushion seats 66 resting thereon and cushion backs 68 and 70. The backs 70 of the rear chairs 54 and 58 may be removed and with the seat cushions thereof used to make a berth bridging the space to the forward chairs 56 and 60 respectively, Figure 9, with the aid of slats 67 when it is desired to convert the chairs into berths.

The backs 68 of the forward chairs 56 and 60 are connected by links 72 to the bases of these chairs in such fashion as to permit of each chair back swinging beyond and below the forward edge of the seat, as shown in Figure 9, to constitute a head or foot board between it and the dashboard of the car, when used for a berth, or swing back to stops (not shown) which limit its backward swing when used as a chair back.

Two upper berths are shown at 74 and 76, Figure 3, connected at one side by links 78 to the side walls of the vehicle and suspended at the other side at 80 from the front and rear walls of the compartment. When berths are not wanted, the links 78 rest normally upward from their points 82 of pivotal support and so maintain the frames of the berths 74 and 76 close to the top. They are adapted, however, to be swung downward so as to hang from the points 82 as shown in Figure 6, thereby lowering the berths by a distance twice as great as the length of the links. Co-operating with these links to make head room for the upper berths is a device for raising the top while maintaining it weather-tight. Any suitable means for this may be employed. To this end the top is shown connected to the body of the vehicle by toggle joints 90, shown in extended position in Figure 9 and collapsed in Figure 4. One link of each may have an extension past the pivot of the joint, to facilitate the operating of the joint, as illustrated, but this is not necessary. Flexible waterproof material 92 safeguards the interior of the vehicle against the elements when the top is raised, preferably made with accordion plaiting. A window 94 in the top, that is normally closed by a cover 96, provides for ventilation. Curtains 98 afford a degree of privacy when hung along the middle of the car, between the berths.

When the top is raised, it may rest on the toggle joints and such other or stiffening support as is provided, which may depend on the degree of stiffness desired. When down, an exterior depending flange encases the collapsed accordion plaiting and the top of body frame, and makes the top secure on the stiff standing frame of the car body. Said frame should be designed with strength to carry this top when up, and the upper berths with contents. But it will be observed that it is not necessary for the top to hold up the upper berths, as they can normally be supported in the side and front and rear frame walls of the compartment. The upper berths may, however, be secured to the top for a special purpose, to wit, at fastenings 100 to hold their inner edges up and to give head room when the compartment is used for dining or games, with the top raised, as shown in Figure 7. A folding table 102, that is ordinarily housed in a recess 104 provided in the floor in the transverse space 62, may be lifted out and its legs set in the recess, as illustrated in the same figure. The table is constituted of a main board 102 to the sides of which at 106 are pivoted wings 108 each half as wide as the main board and adapted to fold over on the face of the main board, as shown in Figure 5, the backs of these leaves constitute the floor, at this place. The legs of the table are pivoted to the under side of the main board, one pair at each end and lying transversely of the car parallel to the board and under it when the table is stowed.

The invention thus provides in one car the necessary conveniences for shelter and living, day and night; and the car having the general aspect of a high grade limousine, has these conveniences self-contained.

It will be observed that many variations may be made from the details illustrated, as for example by the substitution of the air pump commonly provided on an automobile for the moving of water from the tank to the sink by air pressure in place of the hand pump illustrated. And the drawings are diagrammatic in other respects, as for example the representation of thickness of roof and walls. These may be made according to standard or suitable practice, the roof being of a single thickness of flexible fabric, although with its frame the inclusive thickness would approximate that illustrated in the drawings. The links 78, supporting the wall edges of the upper berths may conveniently have a length of 5 inches between centers thus making a drop of 10 inches when they are swung down. If the top rises 16 inches there is thus provided a space of over 2 feet for occupancy. If the head room provided when the car is arranged for sitting and touring be the ordinary dimensions of 4 feet 4 inches, the room provided for standing amounts to 5 feet 8 inches. If the vehicle body have the ordinary standard width of 5 feet 5 inches, it is feasible by the arrangements therein set forth to have sitting space 22 inches wide for each seat, and an aisle 16 inches wide in its lower part and 18 inches in its upper part between the partitions 24; and upper and lower berths about 22 inches wide. And, in a car having the standard wheel base of 136 inches, the berths may be 6 feet long within the front compartment; and the rear compartment may have the general dimensions of 2½ x 5 feet.

Most of the figures of the drawing, for the sake of clearness, illustrate the car body as it may be arranged with only two rear seats thus making a four passenger vehicle for which the equipment for camping is complete; but Figures 3ª and 4ª illustrate how a five passenger car may be provided for riding purposes, by adding a third rear seat. By the provision of a shallow recess in the floor whose bottom 110 is seen in Figure 4ª (or even by merely cutting through the floor without the bottom 110) hinged supporters 112 may be provided which normally are part of the floor, (Figure 8) but are capable of swinging up so that they stand up on end to the level of the bases 64 of the rear seats. These may support a board 113 holding seat cushions 114 which fill the aisle. At other times the board 113 may be carried in the rear compartment, or may constitute a movable shelf therein; and the cushions may be set vertically at the sides of the rear seats, each being of half the thickness of the regular seat cushions. They are illustrated thus in place in Figure 8. They are of suitable width (height) and length (depth) to fill the space between the rear seat cushions 54 and 58. The back cushions 70 may be adjusted for this purpose by tipping them so that they rest on their sides, and by making their dimensions such that the two long sides together reach across the car, thus constituting the rear seat capable of holding three passengers as indicated in Figure 3ª.

I claim as my invention:—

1. The combination, in an automobile, of a vehicle body having a floor and a sloping rear wall; a water tank having a rear wall shaped in conformity with the sloping rear wall, and a front wall oppositely disposed thereto which rises vertically from approximately the line of juncture of the rear wall and the floor; a sink; and means communicating with the tank, to raise water therefrom to the sink.

2. The combination, in an automobile, of a vehicle body having a floor and a sloping rear wall; a water tank having a rear wall shaped in conformity with the sloping rear wall, and a front wall oppositely disposed thereto which rises vertically from approximately the line of juncture of the rear wall and the floor; a sink in the rear of the car body; means communicating with the tank for raising water from the tank to the sink; a water closet over another portion of the sloping rear wall; and connections whereby the sink constitutes a flushing tank for the interior surface of the closet.

3. The combination, in an automobile, of a vehicle having accommodations for travelling and living of persons therein, comprising four wheels and a body supported thereon; said body having a floor, rear and side walls, and seats, the whole arranged and adapted for the body to carry seated passengers; a water tank, a sink, a refrigerator and a shelf arranged around said walls within the body; a top secured on the walls at a height adapted to cover seated passengers and too low for adult passengers to stand under it; means whereby the top is liftable; and means to maintain the top of the car lifted, thereby to give head room above the floor for standing passengers; the said body, with its said floor, walls and top being in all of their positions supported wholly on the said wheels.

4. The combination, in an automobile, of a vehicle body, a partition, interiorly dividing it into front and rear compartments; a longitudinal passage through the middle of the front compartment; a water tank; a sink, and a shelf in the rear compartment on one side thereof; a swinging partition, hinged in the middle portion of the rear wall, reaching substantially the first-mentioned partition, thereby dividing the rear compartment and swinging in both directions therefrom into substantial parallelism with the rear wall, thereby in one position making a door for the division of compartment, and in the other substantially eliminating the division of the compartment; and means to hold the top of the compartment lifted above normal riding position.

5. The combination, in an automobile, of a vehicle having accommodations for travelling and living of persons therein, comprising a body having permanently standing walls, and seats, the whole arranged and adapted for the body to carry seated passengers; a top normally resting on said walls and secured thereon at a height adapted to cover seated passengers and too low for adult passengers to stand under it, and adapted to be raised above them; means to maintain the top in its raised position, thereby providing head room for a person standing; and extensible means permanently closing the space between the body top and top of the walls.

6. The combination, in an automobile, of a vehicle body having permanently standing walls and seats, the whole arranged and adapted for the body to carry seated passengers; a top supported on and resting at the top of said walls and secured thereon at a height adapted to cover seated passengers and too low for adult passengers to stand under it, and adapted to be raised above their top, thereby providing head room for a person standing within the body; means to maintain the top in its raised position; and a flexible extensible section of wall adapted to close the space between top and walls.

7. The combination, in an automobile, of a vehicle body having standing walls and a top that is permanently connected with the walls by a connection adapted to be extended vertically, whereby the top is raised above the walls; a berth supported within at the side of the body parallel to the top and close thereto when the top is down; and means for supporting the berth at a lower level, thereby when the top is raised providing room for occupancy.

8. The combination, in an automobile, of a vehicle body having permanently standing walls; a top supported on said walls at their top and adapted to be raised above their top, thereby providing additional interior head room; means to maintain the top in its raised position; a berth supported within at the side of the body, parallel to the top and close thereto when the top is down; the whole arranged for the inner edge of the berth to be swung upward about the wall edge and supported close under the level of the top when the top is in raised position.

9. The combination, in an automobile, of a vehicle body having permanently standing walls; a top supported on said walls at their top and adapted to be raised above their top, thereby providing additional interior head room; a berth at each side, and links attaching it to the side wall, said links supporting the edge of the berth which is next to the wall and being adapted to stand upward, thereby holding the berth up close to the top, or to stand downward, thereby holding the berth in a lowered position for occupancy; an aisle between the berths and means to support the other edge of each berth in corresponding upper and lower positions.

10. The combination, in an automobile, of a vehicle body having permanently standing walls; including a front wall, and a partition extending transversely in the rear portion, making a front and a rear compartment; a top supported on said walls at their top and adapted to be raised above their top, thereby providing room for a person to stand within the body; an entrance door through the side wall in the front compartment; seats arranged in the front compartment, at front and rear and on both sides, with spaces between extending longitudinally and transversely, the front and rear seats on the same side being convertible to form a lower berth; and an upper berth, supported on the front and side walls and on said partition, and adapted to be moved between a position close to the top when the top is down and a lower position for occupancy when the top is raised.

11. The combination, in an automobile, of a vehicle having accommodations for travelling and living of persons therein, comprising a body having permanently standing walls and seats, the whole arranged and adapted for the body to carry seated passengers, a top supported on said walls at their top at a height adapted to cover seated passengers and too low for adult passengers to stand under it, which body top is adapted to be raised above their top, thereby providing room for a person to stand within the body; a flexible extension of the standing walls and toggle joints, connecting the top and the top portion of said walls permanently and adapted to maintain the top in its raised position with the top and walls tight.

12. The combination, in an automobile, of a vehicle having accommodations for travelling and living of persons therein, comprising four wheels and a body supported thereon, said body having seats and permanently standing walls and seats, the whole arranged and adapted for the body to carry seated passengers; a body top supported at the top of said walls at an elevation giving head room for persons sitting but not for persons standing, and adapted to be raised from their top; extensible means permanently associated with the body-top closing the space between it and the walls-top; and means to maintain the body top in its raised position thereby providing room for a person to stand within the body.

13. The combination, in an automobile, of a vehicle body having accommodations convertible for traveling and for living in the body, comprising seats next to the sides of the body with an aisle between, with bottom and back cushions for the seats; folding supports in the floor adapted to rise and constitute seat supports in the aisle between said seats; cushions adapted to be set upright on the side wall of the body, between said seats and the wall, of half thickness and adapted to be combined to form a cushion on said aisle seat supports; the said back cushions being adapted to stand on their end edges to constitute backs for two seats or on their side edges to constitute backs for said side seats and said aisle seat.

Signed at Boston, Massachusetts, this twelfth day of May, 1920.

CLINTON J. WARREN.